(12) United States Patent
Kaizo et al.

(10) Patent No.: US 9,088,239 B2
(45) Date of Patent: Jul. 21, 2015

(54) VOLTAGE INCREASING CONTROL CIRCUIT AND POWER TOOL

(71) Applicant: PANASONIC CORPORATION, Osaka (JP)

(72) Inventors: Hiroyuki Kaizo, Kyoto (JP); Toshiharu Ohashi, Shiga (JP); Tadashi Arimura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 136 days.

(21) Appl. No.: 13/936,235

(22) Filed: Jul. 8, 2013

(65) Prior Publication Data

US 2014/0015465 A1    Jan. 16, 2014

(30) Foreign Application Priority Data

Jul. 13, 2012 (JP) ................................. 2012-157687

(51) Int. Cl.
*H02P 29/00* (2006.01)
*G05F 1/66* (2006.01)

(52) U.S. Cl.
CPC . *H02P 29/00* (2013.01); *G05F 1/66* (2013.01)

(58) Field of Classification Search
CPC .................................................... H02P 29/00
USPC ................................................ 318/504, 494
See application file for complete search history.

(56) References Cited

U.S. PATENT DOCUMENTS

| 5,657,417 | A  | * | 8/1997 | Di Troia ......................... 388/829 |
| 6,236,177 | B1 | * | 5/2001 | Zick et al. ...................... 318/362 |
| 6,430,463 | B1 | * | 8/2002 | Lysaght ......................... 700/168 |
| 7,372,226 | B2 | * | 5/2008 | Wiker et al. ................... 318/367 |
| 7,518,837 | B2 | * | 4/2009 | Tseng et al. ..................... 361/29 |

FOREIGN PATENT DOCUMENTS

| JP | 11-215884   | A | 8/1999 |
| JP | 2012-030323 | A | 2/2012 |
| JP | 2012-035349 | A | 2/2012 |
| JP | 2012-095459 | A | 5/2012 |
| JP | 2012-105633 | A | 6/2012 |

* cited by examiner

*Primary Examiner* — David S Luo
(74) *Attorney, Agent, or Firm* — Renner, Otto, Boisselle & Sklar, LLP

(57) ABSTRACT

A voltage increasing control circuit is connected to a power supply to regulate power supplied to a load. The voltage increasing control circuit includes a voltage increasing unit configured to increase voltage that is supplied from the power supply, and supply the voltage to the load. A power estimation unit determines whether or not to increase the power supplied to the load. A voltage control unit controls the voltage increasing unit. When the power estimation unit determines to increase the power supplied to the load, the voltage control unit controls the voltage increasing unit to increase the power supplied to the load.

8 Claims, 4 Drawing Sheets

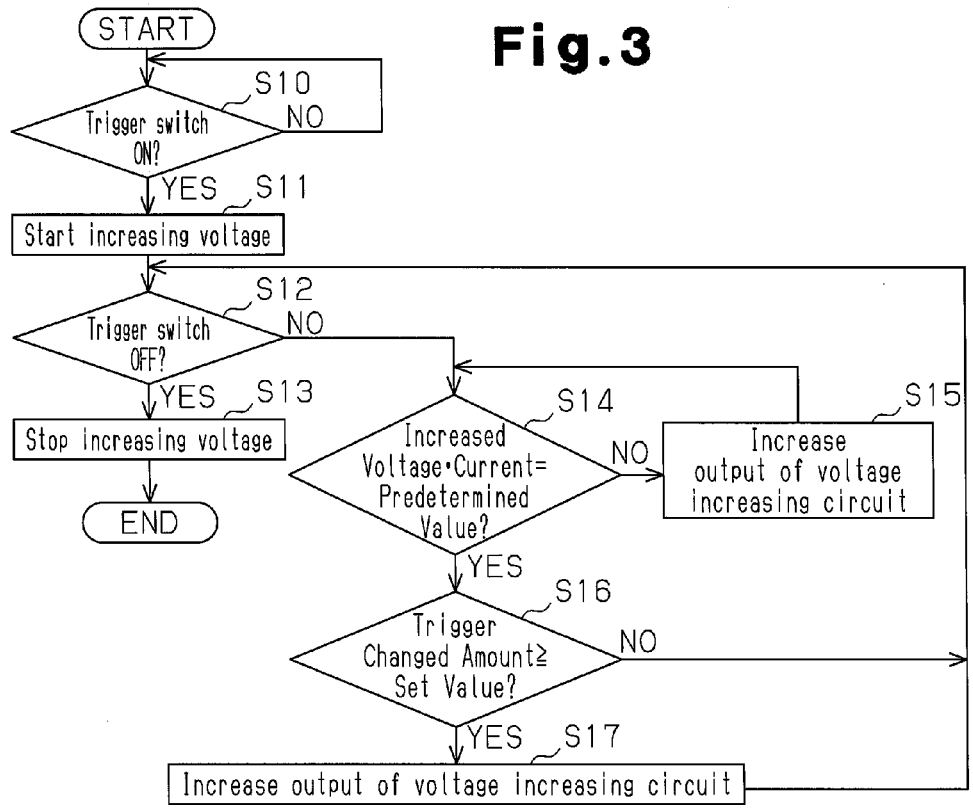
Fig. 3
Fig. 4A
Output Power of Voltage Increasing Circuit
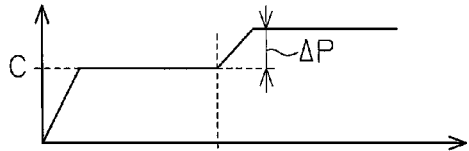
Fig. 4B
Voltage Supplied to Motor
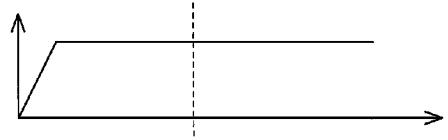
Fig. 4C
Motor Rotation Speed
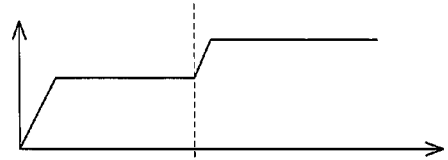
Fig. 4D
Pulled Amount of Trigger Switch
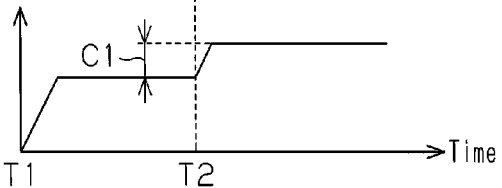

Output Power of Voltage Increasing Circuit

Voltage Supplied to Motor

Motor Rotation Speed

Pulled Amount of Trigger Switch

US 9,088,239 B2

VOLTAGE INCREASING CONTROL CIRCUIT AND POWER TOOL

CROSS-REFERENCE TO RELATED APPLICATIONS

This application is based upon and claims the benefit of priority from prior Japanese Patent Application No. 2012-157687, filed on Jul. 13, 2012, the entire contents of which are incorporated herein by reference.

BACKGROUND ART

The present invention relates to a voltage increasing circuit and a power tool including a voltage increasing circuit.

A power tool uses a voltage increasing circuit to regulate the power (voltage) supplied from a power supply. Japanese Laid-Open Patent Publication No. 2012-354349 discloses an example of a power tool that increases or decreases voltage with a voltage increasing circuit to regulate the power supplied to a power tool even when using a battery pack having a voltage rating that differs from that of the power tool.

In a power tool including such a power increasing circuit, the voltage increasing circuit performs feedback control to follow changes in the power supplied to a load (motor of the power tool), which is the subject supplied with power from the voltage increasing circuit. However, the motor may generate a large output when, for example, a user operates a trigger switch of the power tool or when the power tool automatically shifts gears. This may temporarily decrease the battery voltage and thereby delay the feedback control.

SUMMARY OF THE INVENTION

One aspect of the present invention is a voltage increasing control circuit connectable to a power supply to regulate power supplied to a load. The voltage increasing control circuit includes a voltage increasing unit configured to increase voltage that is supplied from the power supply, and to supply the voltage to the load. A power estimation unit determines whether or not to increase the power supplied to the load. A voltage control unit controls the voltage increasing unit. When the power estimation unit determines to increase the power supplied to the load, the voltage control unit controls the voltage increasing unit to increase the power supplied to the load.

A further aspect of the present invention is a power tool connectable to a power supply. The power tool includes a motor and a voltage increasing control circuit that regulates power supplied to the motor. The voltage increasing control circuit includes a voltage increasing unit configured to increase voltage that is supplied from the power supply, and to supply the motor with the voltage. A power estimation unit is configured to determine whether or not to increase the power supplied to the motor. A voltage control unit controls the voltage increasing unit. When the power estimation unit determines to increase the power supplied to the motor, the voltage control unit controls the voltage increasing unit to increase the power supplied to the motor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a flowchart showing an operation example of the power tool;

FIGS. 4A to 4D are timing charts for the power tool;

DETAILED DESCRIPTION OF THE INVENTION

A power tool according to one embodiment of the present invention will now be described with reference to the drawings.

Figure 1:
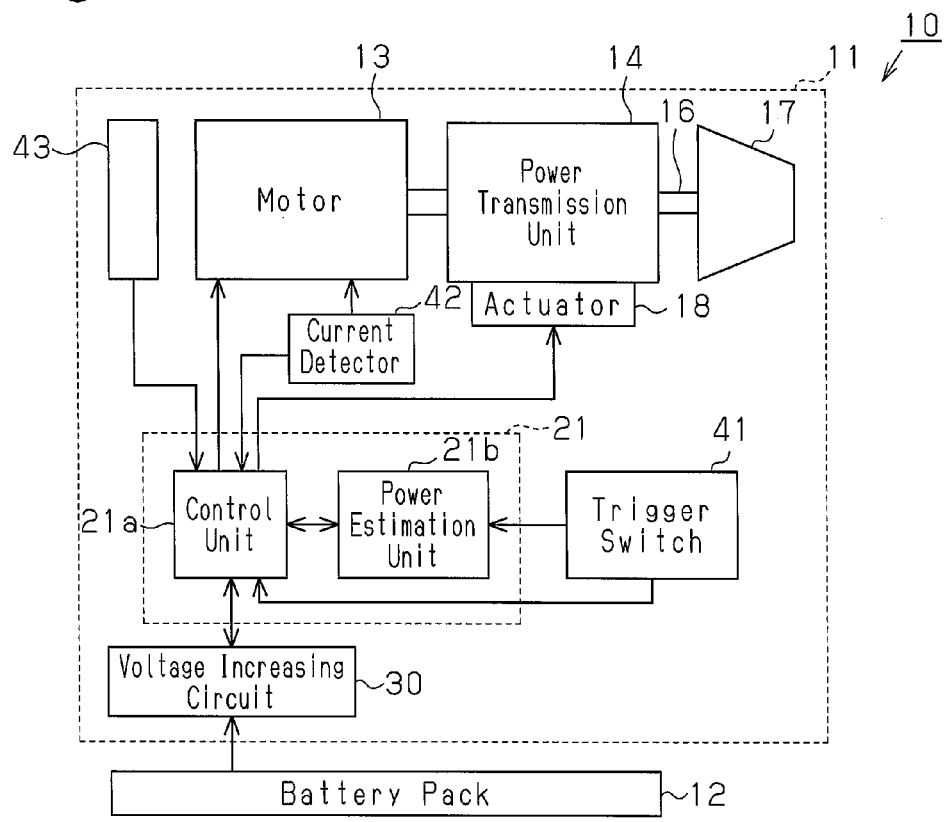
FIG. 1 is a schematic diagram of a power tool according to one embodiment of the present invention.

Referring to FIG. 1, the power tool 10 of the present embodiment includes a main body 11 and a battery pack 12, which is attached in a removable manner to the main body 11. The main body 11 of the power tool 10 includes a motor 13, which is driven by drive power supplied from the battery pack 12, and a power transmission unit 14, which reduces and outputs the torque (rotation speed) of the motor 13. The battery pack 12 includes a rechargeable battery provided with a plurality of battery cells (e.g., lithium-ion batteries).

As shown in FIG. 1, the motor 13 is coupled to a power transmission unit 14, which includes a speed reduction mechanism and a clutch mechanism. The power transmission unit 14 reduces the torque (rotation speed) of the motor 13 and outputs the reduced torque to an output shaft 16. The power transmission unit 14 includes, for example, speed reduction gears that allows for shifting between two speed reduction ratios.

The output shaft 16 includes a distal end to which a tool 17 (bit) is attached. When the torque (rotation speed) of the motor 13 is reduced by the power transmission unit 14 and transmitted to the output shaft 16, the tool 17 is rotated together with the output shaft 16.

The power transmission unit 14 includes a gear shift actuator 18 that shifts speed reduction ratios. The gear shift actuator 18 is, for example, a motor actuator, and shifts speed reduction gears under the control of a control unit 21a, which is included in the control circuit 21. Voltage from the battery pack 12 is regulated before being supplied to the control unit 21a. The control unit 21a operates on the received and regulated voltage. As long as the voltage of the battery pack 12 is suitable for the operation of the control unit 21a, the voltage of the battery pack 12 may be directly supplied to the control unit 21a. The control unit 21a controls the rotation direction of the gear shift actuator 18 relative to the rotation direction of the motor 13 and performs pulse width modulation (PWM) control to control the drive power supplied to the motor 13.

Figure 2:
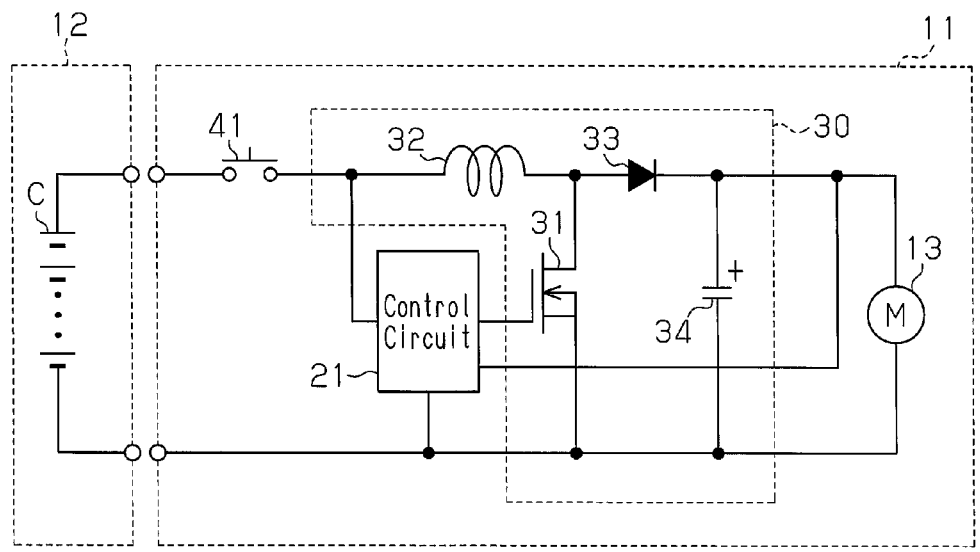
FIG. 2 is an electric circuit diagram of the power tool.

Referring to FIG. 2, the motor 13 receives drive power generated by a voltage increasing circuit 30 that includes a switching element 31 (FET). This drives the motor 13, and the motor 13 generates rotation. The voltage increasing circuit 30 includes the switching element 31, a coil 32, a diode 33, and a capacitor 34. The switching element 31 is electrically connected to the control circuit 21 (control unit 21a). The coil 32 is electrically connected to the control circuit 21. The diode 33 is electrically connected to the coil 32. The capacitor 34 is electrically connected to the diode 33. The control unit 21*a* of the control circuit 21 performs PWM control (ON-OFF control) on the switching element 31 of the voltage increasing circuit 30 to control the power supplied from the battery pack 12 to the motor 13. That is, the control unit 21*a* regulates the power supplied to the motor 13 via the voltage increasing circuit 30 to control the rotation speed of the motor 13.

The main body 11 of the power tool 10 includes a trigger switch 41 that may be operated by a user. The trigger switch 41 is turned on or off to activate or deactivate the motor 13. The trigger switch 41 includes a volume resistor having a resistance that varies in accordance with the operated amount of the trigger switch 41 (pulled trigger amount). The trigger switch 41 provides the control unit 21*a* of the control circuit 21 with an output signal (drive signal) corresponding to the resistance of the volume resistor. In accordance with the output signal from the trigger switch 41, the control unit 21*a* regulates the power supplied to the motor 13 by the switching element 31 of the voltage increasing circuit 30 to activate or deactivate the motor 13 and control the rotation speed during operation.

The main body 11 of the power tool 10 includes a current detector 42 connected to the motor 13 to detect the drive current supplied to the motor 13. A resistor may be used as the current detector 42. The control unit 21*a* of the control circuit 21 detects the drive current in predetermined sampling time intervals based on detection signals from the current detector 42. Further, the control unit 21*a* obtains the load torque applied to the output shaft 16 (tool 17) based on the detected drive current and the gear of the power transmission unit 14 when the drive current is detected.

Further, the main body 11 of the power tool 10 includes a rotation speed detector 43 that detects the rotation speed of the motor 13. The rotation speed detector 43 includes a sensor magnet and a Hall element arranged opposing the sensor magnet. The sensor magnet includes multiple magnetic poles and is fixed to the motor 13 to rotate integrally with the output shaft 16. The Hall element provides the control unit 21*a* with a detection signal indicating magnetic flux changes caused by the rotation of the sensor magnet. The control unit 21*a* obtains the rotation speed of the motor 13 from the detection signal of the rotation speed detector 43.

Based on the obtained load torque, the control unit 21*a* shifts gears of the power transmission unit 14 with the gear shift actuator 18. Thus, the motor 13 automatically shifts gears. The speed reduction mechanism of the power transmission unit 14 is, for example, a planetary gear speed reduction mechanism that includes a sun gear, planet gears, and a ring gear. The sun gear is rotated about the rotation axis of the motor 13. The planet gears are arranged around and engaged with the sun gear. The ring gear is engaged with the planet gears. The gear shift actuator 18 varies the position of the ring gear to change the planet gears engaged with the ring gear and control the speed reduction gear. The power tool 10 may include a drive state detector to detect whether or not the gear shift actuator 18 has moved the ring gear to the correct position. In this case, the control unit 21*a* controls the gear shift actuator 18 based on detection signals from the drive state detector.

In the power tool 10, when the user pulls the trigger switch 41, an output signal corresponding to the pulled trigger amount is provided from the trigger switch 41 to the control unit 21*a* and a power estimation unit 21*b* of the control circuit 21.

The control unit 21*a* controls the switching element 31 based on the output signal from the trigger switch 41 to control the activation, deactivation, and rotation speed of the motor 13. The power transmission unit 14 reduces and transmits the torque (rotation speed) of the motor 13 to the output shaft 16 and rotates the tool 17. Further, the control unit 21*a* shifts the power transmission unit 14 to a high gear or a low gear in accordance with the load torque. In this case, the power transmission unit 14 selects a high gear when the load torque is small to drive the tool 17 with a high speed rotation and a low torque. When the power tool 10 is activated, the power transmission unit 14 selects the high gear. As the load torque increases and exceeds a predetermined torque, the power transmission unit 14 selects the low gear to drive the tool 17 with a low speed rotation and a high torque. The speed reduction mechanism of the power transmission unit 14 is not limited to a planetary gear reduction mechanism and may be a normal gear train. In this case, the control unit 21*a* controls only the activation, deactivation, and rotation speed of the motor 13 based on the output signal from the trigger switch 41.

The power estimation unit 21*b* monitors changes in the pulled amount of the trigger switch 41 to determine whether or not to increase the power supplied to the motor 13, which serves as a load. More specifically, the resistance of the volume resistor varies in accordance with the pulled amount of the trigger switch 41. This varies the voltage input to the power estimation unit 21*b*, which determines whether or not to increase the power based on the varied input voltage.

An example of the operation of the power tool 10 will now be described.

With reference to FIGS. 3 and 4, when the trigger switch 41 is pulled and turned on at time T1 (step S10: YES), the battery pack 12 starts supplying power, and the control unit 21*a* performs PWM control on the switching element 31 of the voltage increasing circuit 30 to start increasing the voltage (stet S11). Then, when the trigger switch 41 is released and turned off (step S12: YES), the power supply from the battery pack 12 is stopped. This stops increasing the voltage with the voltage increasing circuit 30 (step S13).

When the trigger switch 41 remains pulled and is continuously turned on (step S12: NO), the control unit 21*a* monitors the product of the voltage, which is increased by the voltage increasing circuit 30, and the current (step S14).

The control unit 21*a* controls the duty ratio of the switching element 31 in the voltage increasing circuit 30 to increase the output (power) of the voltage increasing circuit 30 (step 15) until the product of the increased voltage and current reaches a predetermined value C (step S14: NO), which corresponds to the operated amount (pulled amount) of the trigger switch 41. That is, an increase amount $\Delta P$ of the output power from the voltage increasing circuit 30 varies in accordance with the pulled amount of the trigger switch 41.

When the product of the increased voltage and current reaches the predetermined value C that corresponds to the operated amount (pulled amount) of the trigger switch 41 (step S14: YES), the power estimation unit 21*b* monitors changes in the pulled amount of the trigger switch 41 (step S16). For example, when the user further pulls the trigger switch 41 at time T2, and the changed amount of the pulled amount within a predetermined time becomes greater than or equal to a set value C1 (step S16: YES), the power estimation unit 21*b* recognizes a sudden change in the pulled amount of the trigger switch 41 and determines to increase the power for the motor 13, which serves as a load. As a result, the control unit 21*a*, which serves as a voltage increasing control unit, increases the duty ratio of the switching element 31 so that the output power supplied from the voltage increasing circuit 30 to the motor 13 is increased by the increase amount $\Delta P$ (step S17).

A sudden change in the pulled amount of the trigger switch 41 changes the resistance of the volume resistor in the trigger switch 41. This suddenly varies the signal provided from the trigger switch 41 based on the pulled amount of the trigger switch 41. Referring to FIGS. 7A to 7D, if steps S16 and S17 were to be omitted, such a sudden change in the pulled amount of the trigger switch 41 would decrease the battery voltage of the battery pack 12 and decrease the output power (output voltage·current) of the voltage increasing circuit 30. FIGS. 7a to 7D are timing charts showing an example of the operation of a power tool when steps S16 and S17 are omitted.

As long as the pulled amount of the trigger switch 41 is not sudden, an extreme decrease in the battery voltage is suppressed. Even if the battery voltage decreases, the control unit 21a controls the switching element 31 to increase the output power (voltage·current) of the voltage increasing circuit 30. As described above, however, when the changed amount of the pulled amount of the trigger switch 41 within a predetermined time becomes greater than or equal to the set value in step S16, the power estimation unit 21b determines to increase the power for the motor 13. In accordance with this determination, the control unit 21a increases the output power of the voltage increasing circuit 30 even when the battery voltage decreases. This allows for the application of a substantially constant voltage to the motor 13, and suppresses delays in the feedback control performed by the voltage increasing circuit 30.

The advantages of the present embodiment will now be described.

(1) The power tool 10 is provided with a voltage increasing control circuit that includes the voltage increasing circuit 30, the power estimation unit 21b, and the control unit 21a. The voltage increasing circuit 30 increases the voltage supplied from the battery pack 12, which serves as a power supply, and supplies the voltage to the motor 13. The power estimation unit 21b determines whether or not to increase the power supplied to the motor 13. When the power estimation unit 21b determines to increase the power supplied to the motor 13, the control unit 21a increases the power supplied to the motor 13. In this manner, when the power estimation unit 21b estimates that the power supplied to the motor 13 is to be increased, the control unit 21a controls the voltage increasing circuit 30 to increase the output power in accordance with the estimation. This suppresses delays in the feedback control performed by the voltage increasing circuit 30.

(2) The voltage increasing control circuit of the power tool 10 includes the trigger switch 41, which serves as an input signal changing unit that changes the signal provided to the power estimation unit 21b. The trigger switch 41 includes a resistor having a resistance that changes in accordance with the amount of the trigger switch 41 operated by a user, and provides the power estimation unit 21b with a signal corresponding to the resistance. Based on the signal provided from the trigger switch 41, the power estimation unit 21b determines whether or not to increase the power supplied to the motor 13. Thus, for example, when the user suddenly pulls the trigger switch 41, the output power (voltage·current) of the voltage increasing circuit 30 is increased accordingly. Thus, even if the operation of the trigger switch 41 decreases the battery voltage, changes may be suppressed in the voltage applied to the motor 13.

It should be apparent to those skilled in the art that the present invention may be embodied in many other specific forms without departing from the spirit or scope of the invention. Particularly, it should be understood that the present invention may be embodied in the following forms.

In the above embodiment, the power estimation unit 21b determines whether or not to increase the power supplied to the motor 13 based on the changed amount of the operated amount of the trigger switch 41. However, the power estimation unit 21b does not necessarily have to do so.

Figure 5:
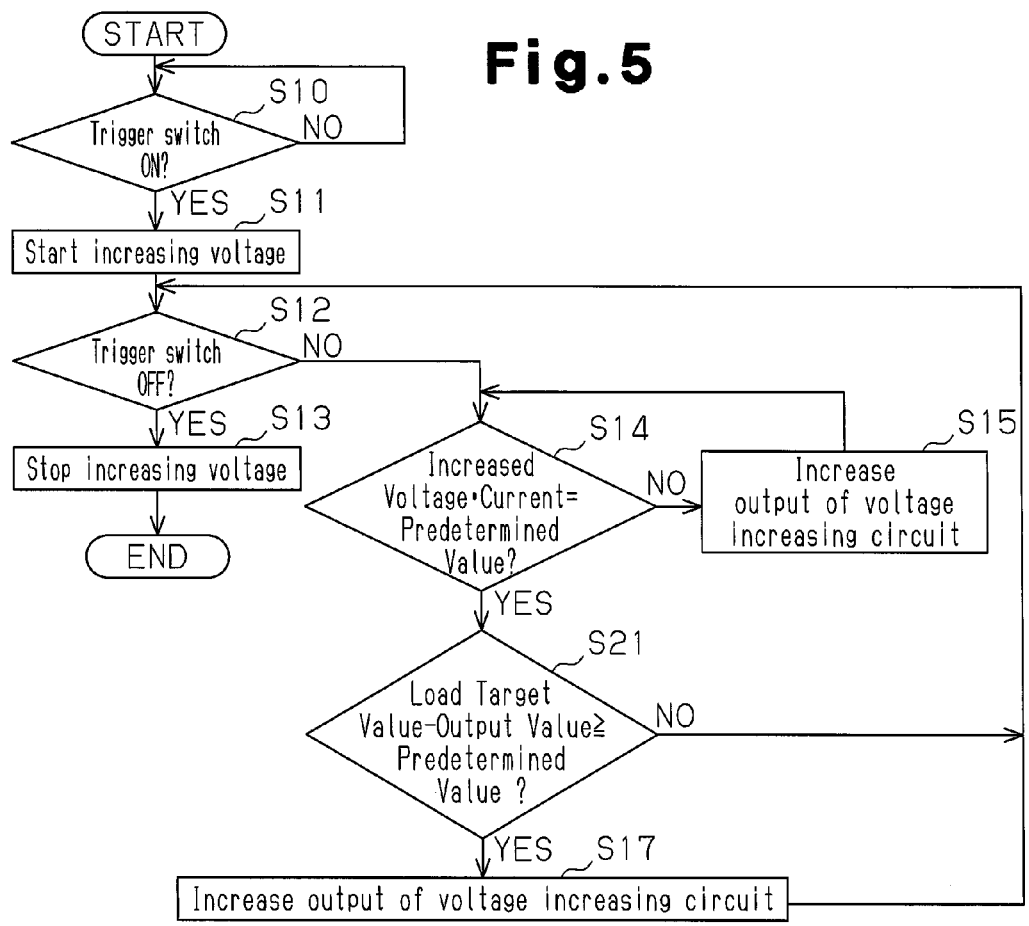
FIG. 5 is a flowchart showing an operation example of the power tool according to a further embodiment of the present invention.

For example, the power estimation unit 21b may determine whether or not to increase the power supplied to the motor 13 based on, for example, the difference between the target rotation speed of the motor 13 and the present rotation speed of the motor 13, which is the actual output value. In this case, as shown in FIG. 1, a rotation speed detector 43 is used to detect the rotation speed of the motor 13. The power estimation unit 21b determines the target rotation speed of the motor 13 based on the operated amount of the trigger switch 41 (drive signal from the trigger switch 41). Then, the power estimation unit 21b determines whether or not to increase the power supplied to the motor 13 based on the difference between the target rotation speed and the rotation speed detected by the rotation speed detector 43. In this configuration, referring to FIG. 5, when step S14 is YES, the power estimation unit 21b, which monitors the present rotation speed R1 of the motor 13 input to the control unit 21a, calculates a difference (R2−R1) of the present target rotation speed R2 and the present rotation speed R1 of the motor 13, and compares the difference (R2−R1) with the predetermined value V1 (step S21). When the target rotation speed R2 is equal to the present rotation speed R1, the difference (R2−R1) is 0, and the target rotation speed R2 conforms to the present rotation speed R1 of the motor 13. Further, for example, when the difference (R2−R1) becomes greater than or equal to the predetermined value V1 (step S21: YES), the power estimation unit 21b determines to increase the power supplied to the motor 13. When the power estimation unit 21b determines to increase the power, the control unit 21a increases the duty ratio of the switching element 31 to increase the power supplied to the motor 13 from the voltage increasing circuit 30 by an amount corresponding to ΔP (step S17).

For example, a torque detector may be used to detect the load torque applied to the output shaft 16. In this case, when the load torque detected by the torque detector is greater than or equal to a predetermined value Tr1, the power estimation unit 21b may determine to increase the power supplied to the motor 13. As described above, the control unit 21a of the control circuit 21 detects the drive current from the detection signal of the current detector 42 (torque detector) generated in predetermined sampling time intervals, and detects the load torque applied to the output shaft 16 (tool 17) based on the detected drive current and the gear of the power transmission unit 14 when the drive current is detected.

Figure 6:
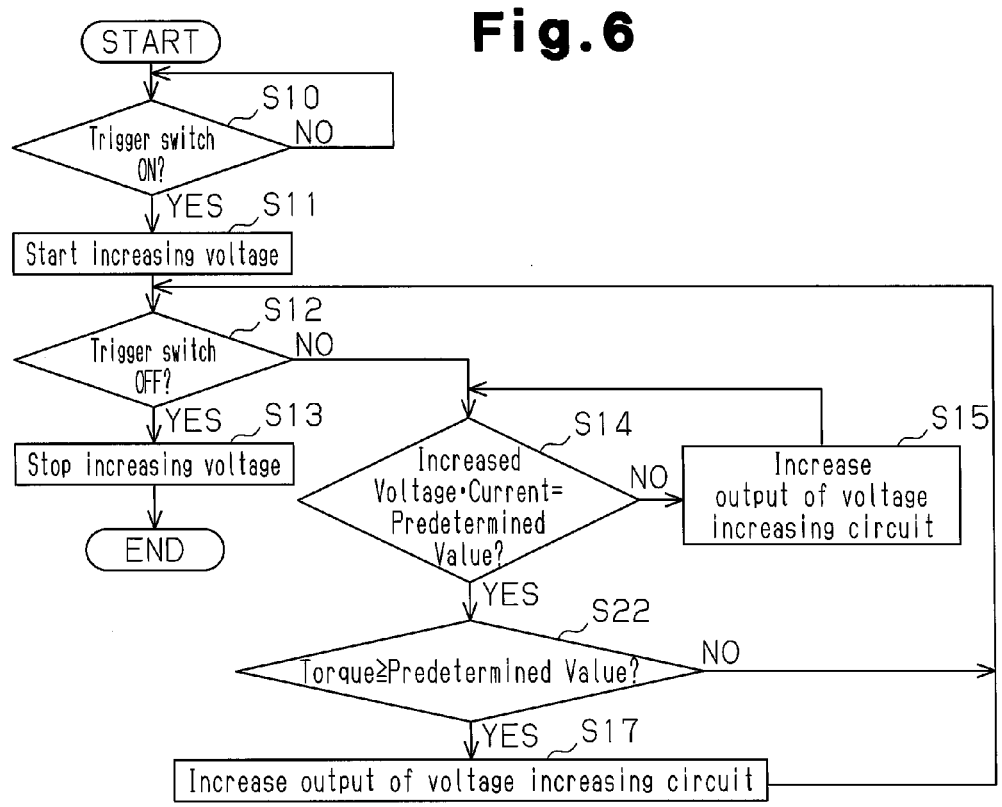
FIG. 6 is a flowchart showing an operation example of the power tool according to another embodiment of the present invention.
Figure 7A:
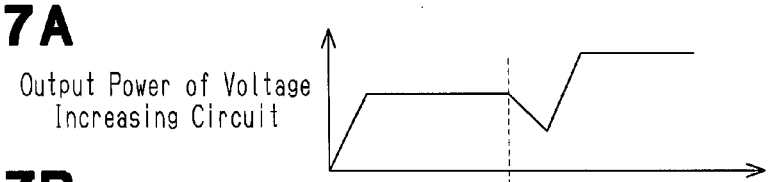
FIGS. 7A to 7D are timing charts for a power tool of a comparative example.
Figure 7B:
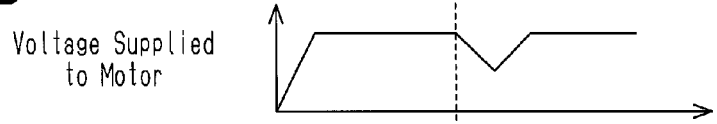
Figure 7C:
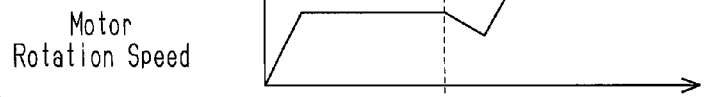
Figure 7D:
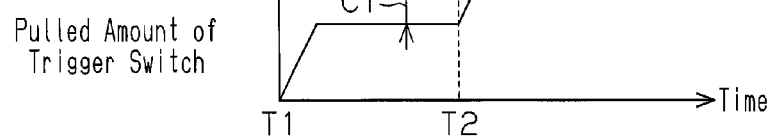

When the load torque is greater than or equal to the predetermined value Tr1, the control unit 21a determines that a high torque is needed. Thus, when the load torque is greater than or equal to a predetermined value Tr1, the control unit 21a shifts the power transmission unit 14 to a high torque gear with the gear shift actuator 18. In such a configuration, referring to FIG. 6, when step S14 is YES, the power estimation unit 21b determines whether or not the load torque calculated by the current detector 42 and the control unit 21a is greater than or equal to a predetermined value Tr1 (step S22). For example, when the obtained load torque is greater than or equal to the predetermined value Tr1 (step S22: YES), the power estimation unit 21b determines to increase the power supplied to the motor 13. When the control unit 21a determines to increase power with the power estimation unit 21b, the control unit 21a increases the duty ratio of the switching element 31 to increase the power supplied to the motor 13 from the voltage increasing circuit 30 by an amount corresponding to ΔP (step S17).

In the above embodiment, the battery pack 12 is used as the power supply for the power tool 10 (main body 11). However, for example, a commercial power supply may be used as the power supply.

In the above embodiment, the voltage increasing control circuit including the voltage increasing circuit 30 and the control circuit 21 is arranged in the power tool 10. However, the employment of the voltage increasing control circuit is not limited to the power tool 10. For example, a vacuum cleaner, a blower, or a lighting device may be provided with a voltage increasing control circuit including the voltage increasing circuit 30. In the case of a lighting device, the light source corresponds to a load.

The present examples and embodiments are to be considered as illustrative and not restrictive, and the invention is not to be limited to the details given herein, but may be modified within the scope and equivalence of the appended claims.

The invention claimed is:

1. A voltage increasing control circuit connectable to a power supply to regulate power supplied to a load, the voltage increasing control circuit comprising:
   a voltage increasing unit configured to increase voltage that is supplied from the power supply, and to supply the voltage to the load;
   a power estimation unit that determines whether or not to increase the power supplied to the load;
   a voltage control unit that controls the voltage increasing unit, wherein when the power estimation unit determines to increase the power supplied to the load, the voltage control unit controls the voltage increasing unit to increase the power supplied to the load; and
   an input signal changing unit that changes a signal provided to the power estimation unit, wherein the power estimation unit is configured to determine whether or not to increase the power supplied to the load based on the signal provided from the input signal changing unit.

2. The voltage increasing control circuit according to claim 1, wherein
   the power estimation unit determines a target value for the load based on the signal from the input signal changing unit, and
   the power estimation unit is configured to determine whether or not to increase the power supplied to the load based on a difference between the target value of the load and an output value of the load.

3. The voltage increasing control circuit according to claim 1, wherein the input signal changing unit includes a trigger switch that provides the power estimation unit with the signal in correspondence with an amount the trigger switch is operated by a user.

4. The voltage increasing control circuit according to claim 3, wherein the trigger switch includes a resistor having a resistance varied in correspondence with the operated amount of the trigger switch, and the trigger switch provides the power estimation unit with the signal that is in correspondence with the resistance.

5. A power tool connectable to a power supply, the power tool comprising:
   a motor;
   a voltage increasing control circuit that regulates power supplied to the motor, wherein the voltage increasing control circuit includes
   a voltage increasing unit configured to increase voltage that is supplied from the power supply, and to supply the motor with the voltage,
   a power estimation unit configured to determine whether or not to increase the power supplied to the motor, and
   a voltage control unit that controls the voltage increasing unit, wherein when the power estimation unit determines to increase the power supplied to the motor, the voltage control unit controls the voltage increasing unit to increase the power supplied to the motor; and
   a trigger switch that provides the power estimation unit with a drive signal in correspondence with an amount the trigger switch is operated by a user, wherein the power estimation unit is configured to determine whether or not to increase the power supplied to the motor based on the drive signal.

6. The power tool according to claim 5, further comprising a rotation speed detector that detects a rotation speed of the motor, wherein the power estimation unit is configured to determine whether or not to increase the power supplied to the motor based on a difference between a target rotation speed of the motor, which is determined from the operated amount of the trigger switch, and the rotation speed measured by the rotation speed detector.

7. The power tool according to claim 5, further comprising:
   a power transmission unit that reduces a rotation speed of the motor and transmits the reduced rotation speed to an output shaft, wherein the power transmission unit is configured to have a variable speed reduction ratio; and
   a torque detector that detects a load torque applied to the output shaft,
   wherein the power estimation unit is configured to determine to increase the power supplied to the motor when the load torque detected by the output shaft is greater than or equal to a predetermined value.

8. The power tool according to claim 5, wherein
   the trigger switch includes a resistor having a resistance varied in correspondence with the operated amount of the trigger switch, and
   the trigger switch provides the power estimation unit with the drive signal that is in correspondence with the resistance.

* * * * *